US012794137B2

(12) United States Patent
Chivukula et al.

(10) Patent No.: US 12,794,137 B2
(45) Date of Patent: Nov. 10, 2026

(54) ANTENNA SYSTEM

(71) Applicant: Honeywell International Inc., Charlotte, NC (US)

(72) Inventors: Rajesh Chivukula, Tewkesbury (GB); Shubhadip Paul, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/923,310

(22) Filed: Oct. 22, 2024

(65) Prior Publication Data

US 2025/0392051 A1 Dec. 25, 2025

(30) Foreign Application Priority Data

Jun. 21, 2024 (IN) ............................ 202411047857

(51) Int. Cl.
*H01Q 13/02* (2006.01)
*H01Q 1/12* (2006.01)
*H01Q 1/42* (2006.01)

(52) U.S. Cl.
CPC ........... *H01Q 13/025* (2013.01); *H01Q 1/125* (2013.01); *H01Q 1/42* (2013.01)

(58) Field of Classification Search
CPC ......... H01Q 13/025; H01Q 1/125; H01Q 1/42
See application file for complete search history.

(56) References Cited

U.S. PATENT DOCUMENTS 5,652,631 A 7/1997 Bullen et al.
5,691,736 A * 11/1997 Hunn .................... H01Q 1/425 244/121
10,199,722 B2 * 2/2019 Stratis ...................... H01Q 1/42
2007/0195004 A1 * 8/2007 Rebeiz ................ H01Q 1/3233 343/876
2015/0255877 A1 9/2015 Liu et al.
(Continued)

FOREIGN PATENT DOCUMENTS

EP 2930788 A1 10/2015

OTHER PUBLICATIONS

Hasani et al., "Dual-Band Circularly Polarized Transmitarray Antenna for Satellite Communications at (20,30) GHz," IEEE Transactions on Antennas and Propagation, vol. 67, No. 8, pp. 5325-5333, Aug. 24, 2019.

(Continued)

*Primary Examiner* — Hai V Tran
(74) *Attorney, Agent, or Firm* — Alston & Bird LLP

(57) ABSTRACT

An improved antenna system is provided for controlling satellite communications in a satellite communication network. Antennas are disposed beneath a concave interior of a transmission surface. The transmission surface has a substantially similar shape or curvature of a radome top, and may be affixed to or integrated with the radome top to provide a phase compensated radome. The antennas may be mechanically moved, such as laterally translated, tilted, and/or rotated. The antennas may be electrically actuated via a switch. The transmission surface includes an array or patch of cells such as dual-band dual-polarized cells and/or quad-band dual-polarized cells. The improved antenna system enables high gain beam steering and Ku band, K band, and Ka band transmission and reception.

20 Claims, 7 Drawing Sheets

(56) References Cited

U.S. PATENT DOCUMENTS

2019/0280391 A1* 9/2019 Sanjuan Flores ........ H01Q 1/38

OTHER PUBLICATIONS

Extended European Search Report Mailed on Oct. 27, 2025 for EP Application No. 25179143, 13 page(s).
Bagheri et al., "Dual-band, dual-polarised metallic slot transmitarray antenna", IET microwaves, antennas & propagation, vol. 11, No. 3, Dec. 6, 2017, pp. 402-409.
Qin et al., "Conformal transmitarrays for unmanned aerial vehicles aided 6G networks", IEEE Communications Magazine, vol. 60, No. 1, Feb. 11, 2022, pp. 14-20.
Glybovski et al., "Metasurfaces: From microwaves to visible", Physics Reports, vol. 634, May 4, 2016, pp. 1-72.
EP Office Action Mailed on Jul. 10, 2026 for EP Application No. 25179143, 11 page(s).
Wang et al., "Tightly coupled Huygens element-based conformal transmitarray for E-band airborne communication systems", IEEE Transactions on Antennas and Propagation, vol. 71, No. 3, Feb. 3, 2023, pp. 2467-2475.

* cited by examiner

ANTENNA SYSTEM

CROSS REFERENCE TO RELATED APPLICATION

This application claims priority to Indian Application No. 202411047857, filed Jun. 21, 2024, the entire contents of which are hereby incorporated by reference.

TECHNICAL FIELD

The present application relates generally to satellite communications. More specifically, the present application relates to an antenna system for satellite communications.

BACKGROUND

Vehicles such as aircrafts have radomes affixed to the vehicle to protect their antennas, such as those used for satellite communications. The antenna therefore has size constraints due to the aerodynamic nature of the radome. The weight of both the radome and the antenna is of further concern to promote fuel efficiency and maneuverability.

Larger antennas may offer better performance than some smaller antennas, but performance trade-offs should be carefully considered, particularly for aircraft configurations. Larger antennas may further require more robust or heavier radomes for protection, which may further affect vehicle performance with regard to fuel efficiency and maneuverability. Such vehicles may therefore benefit from reducing the weight and/or size of the antenna system. Structural integrity and design constraints should also be considered along with performance trade-offs in antenna system design.

Through applied effort, ingenuity, and innovation, identified deficiencies and problems have been solved by developing solutions that are structured in accordance with the embodiments of the present disclosure, many examples of which are described in detail herein.

BRIEF SUMMARY

An improved antenna system is therefore provided that reduces the size and weight of antennas in comparison to antennas of certain traditional or prior antenna systems. The improved antenna system includes a phase compensated radome to provide high gain and a steerable beam. The phase compensated radome, or transmit array, allows the beam to propagate through its structure, and enables steering of the beam. The improved antenna system includes a light-weight feed antenna that may be rotated, tilted, and translated to achieve beam steering. A dual-band circularly polarized phase compensated radome supports transmitting and receiving wide steering angles. Dual-band includes (1) Ku Rx (10.7 GHZ-12.75 GHz) and Ku Tx (13.75 GHZ-14.5 GHZ) or (2) K Rx (17.7 GHZ-21.2 GHz) and Ka Tx (27.5 GHZ-31.0 GHZ). Quad-band includes Ku Rx (10.7 GHZ-12.75 GHz), Ku Tx (13.75 GHZ-14.5 GHZ), K Rx (17.7 GHZ-21.2 GHz), and Ka Tx (27.5 GHZ-31.0 GHz).

An antenna system is provided, comprising one or more antennas disposed beneath a concave interior of a transmission surface, and the transmission surface. The one or more antennas comprise one or more feedhorn antennas, and wherein the one or more feedhorn antennas comprise substantially conical surfaces open toward a concave interior of the transmission surface. The antenna system further includes one or more mechanical components configured to adjust the one or more antennas. The antenna system further includes one or more electrically operated switches configured to control actuation of the one or more antennas. The transmission surface may include an equi-phased transmission surface.

The transmission surface may be mountable to an inner surface of a radome top. The transmission surface is a phase compensated structure configured to convert spherical waves of the one or more antennas into plane waves. The transmission surface comprises multiple layers of one or more dual-band dual-polarized cells or quad-band dual-polarized cells. The one or more antennas are tiltable, rotatable, and laterally movable. The antenna system is configured for any of Ku, K and Ka bands frequency communication. The one or more antennas comprise one or more feed antennas. The transmission surface comprises an array of one or more dual-band dual-polarized cells or quad-band dual-polarized cells.

A phase compensated radome top is provided, comprising a transmission surface having a substantially similar curvature to a curvature of at least a protective layer of the phase compensated radome top, and the protective layer, wherein the protective layer is configured to protect the transmission surface, and, when coupled to a radome base, one or more antennas disposed beneath a concave interior of the protective layer and a concave interior of the transmission surface. The transmission surface is an equi-phased transmission surface and may be affixed to at least one of an inner surface of the protective layer or a framework of the phase compensated radome top.

The transmission surface is configured to convert spherical waves of the one or more antennas into plane waves. The transmission surface comprises multiple layers of one or more dual-band dual-polarized cells or quad-band dual-polarized cells. The transmission surface includes an array of one or more of dual-band dual-polarized cells or quad-band dual-polarized cells.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
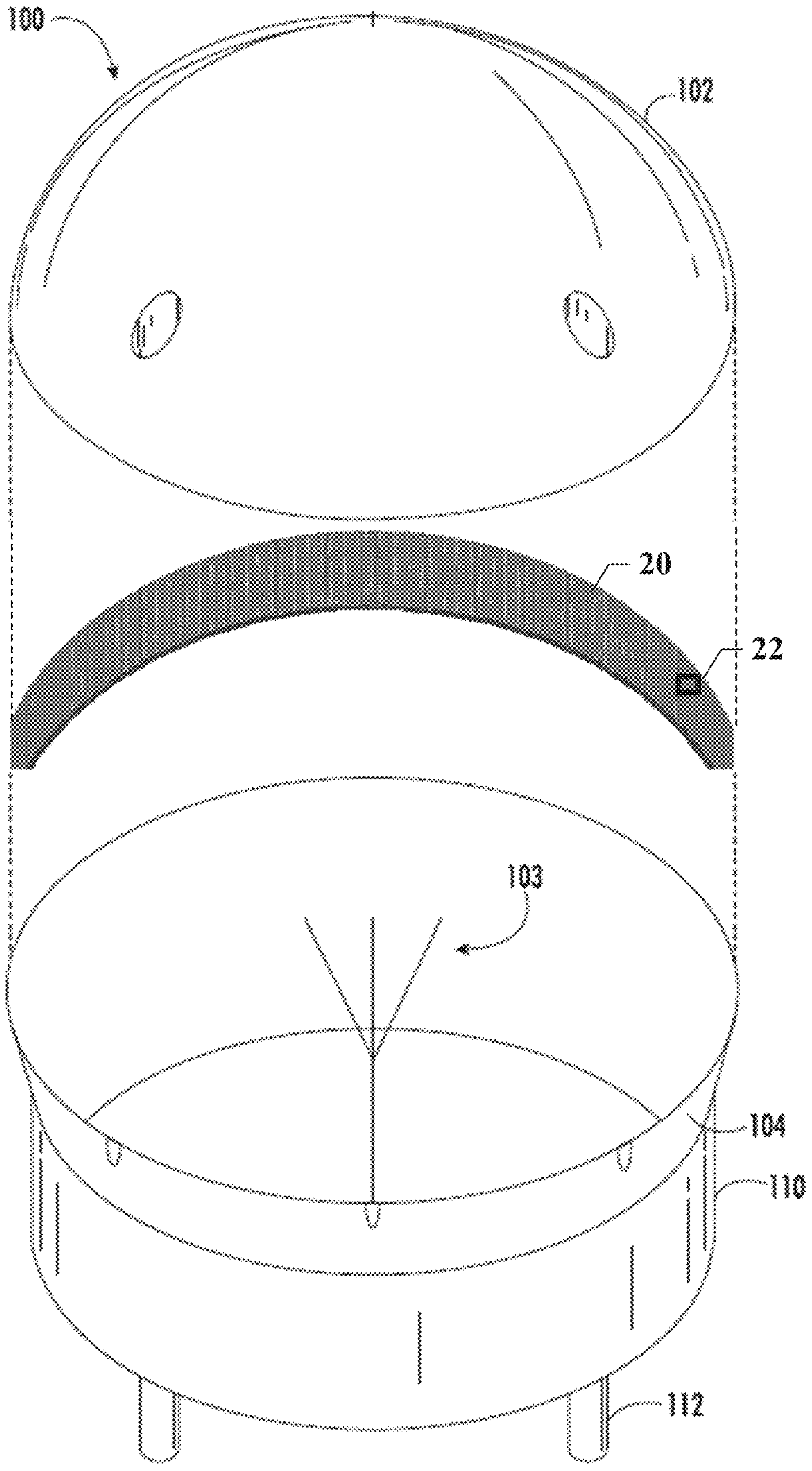

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 is a perspective view of an antenna system, in accordance with at least one example embodiment of the present disclosure.

Figure 2:
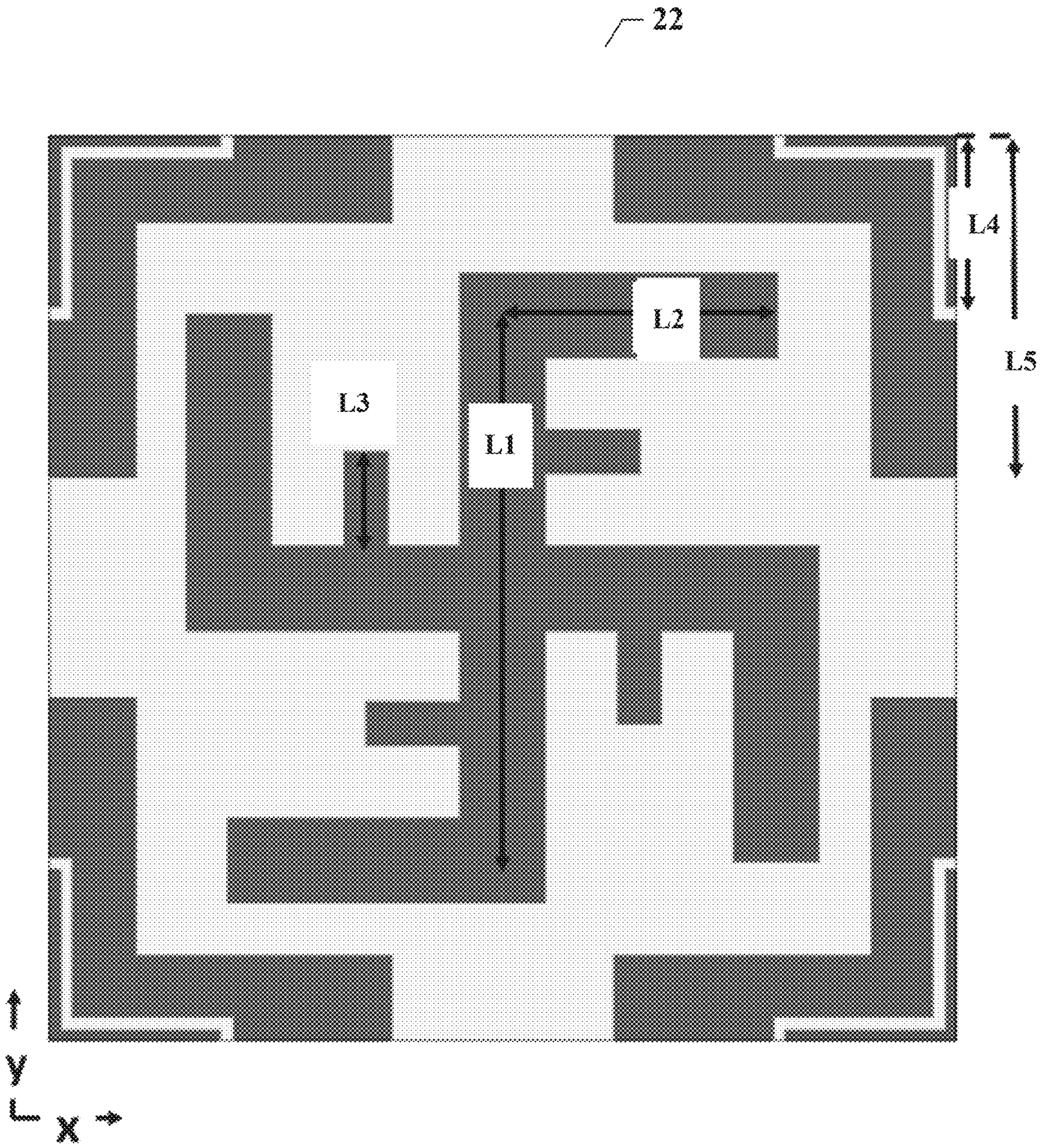

FIG. 2 is a schematic of a cell of a transmission surface, in accordance with at least one example embodiment of the present disclosure.

Figure 3:
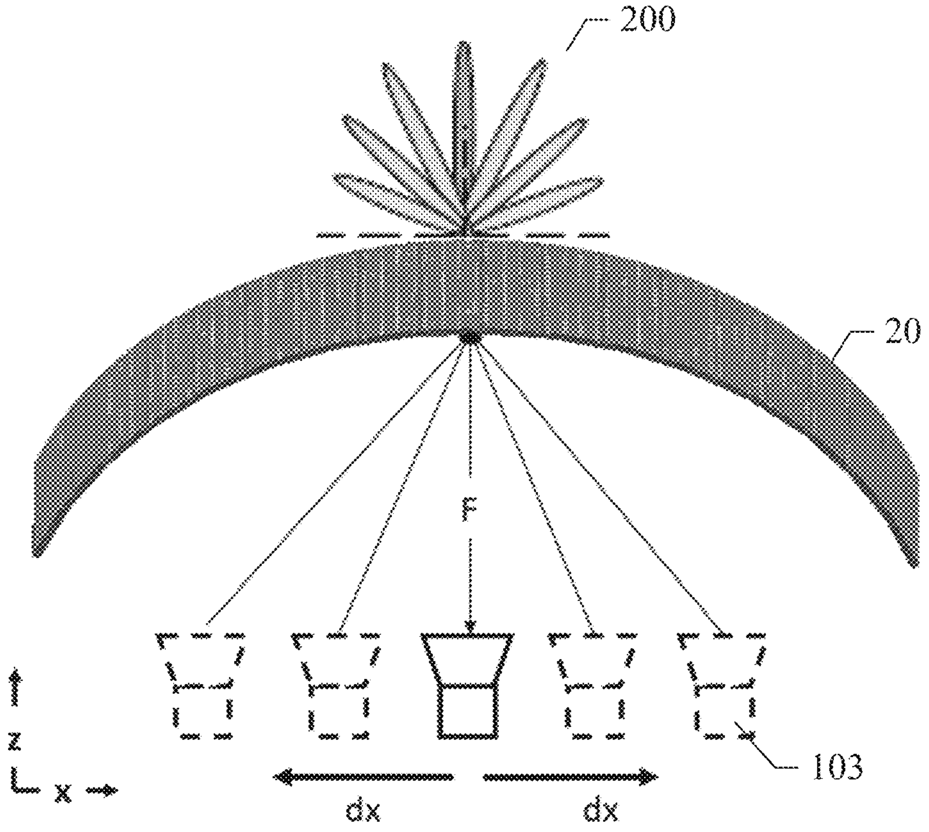

FIG. 3 is a schematic of a partial view of an antenna system and beam pattern, in accordance with at least one example embodiment of the present disclosure.

FIGS. 4A-4E are schematics of partial views of an antenna system, illustrating various movements of antennas, in accordance with at least one example embodiment of the present disclosure.

Figure 5:
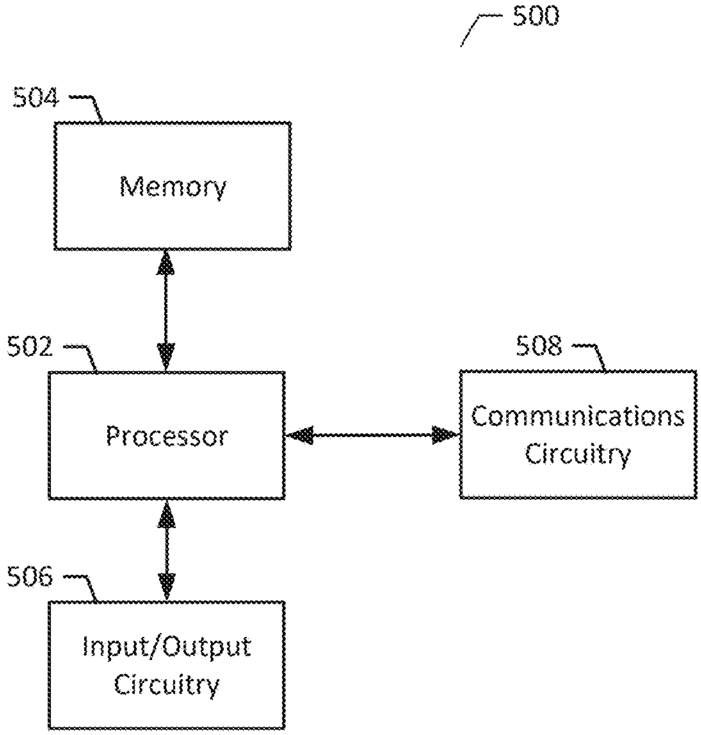

FIG. 5 is a representation of an apparatus for controlling aspects of an antenna system, in accordance with at least one example embodiment of the present disclosure.

Figure 6:
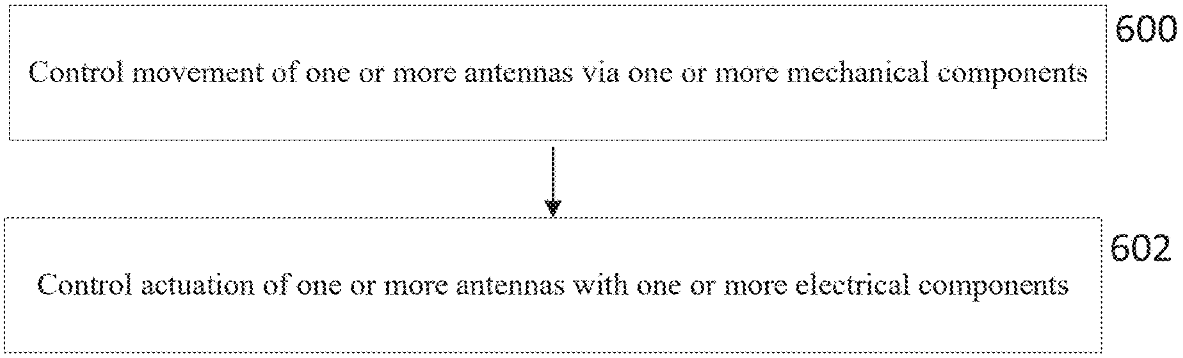

FIG. 6 is a flowchart of operations according to certain example embodiments, in accordance with at least one example embodiment of the present disclosure.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices and/or networks. Similarly, where a computing device is described herein to send data to another computing device, it will be appreciated that the data may be sent directly to another computing device or may be sent indirectly via one or more intermediary computing devices and/or networks.

As used herein, the term "example" means serving as an example, instance, or illustration. Any aspect or design described herein as "example" is not necessarily to be construed as preferred or advantageous over other aspects or designs. Rather, use of the word example is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including", and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "system" refers to, or includes a computer-related entity or an entity related to an operational apparatus with one or more specific functionalities, wherein the entity can be either hardware, a combination of hardware and software, software, or software in execution. As an example, a system may be, but is not limited to being, a process running on a processor, a processor, an object, an executable, a thread of execution, computer-executable instructions, a program, and/or a computer. By way of illustration and not limitation, both an application running on a server and the server can be a system.

As used herein, the term "electrical communication" means that an electric current and/or electric signals are capable of making the connection between the areas specified.

As used herein, the terms "coupled," "fixed," "attached to," and the like refer to both direct coupling, fixing, or attaching, as well as indirect coupling, fixing, or attaching through one or more intermediate components or features, unless otherwise specified herein.

As used herein, terms of approximation, such as "approximately," "substantially," or "about," refer to being within manufacturing or engineering tolerances. For example, terms of approximation may refer to being withing a five percent margin of error.

FIG. 1 is an exploded view of an antenna system 100 for controlling satellite communication in a satellite communication network in accordance with example embodiments. In various examples, the antenna system may be configured on a vehicle such as an aircraft, such as a rotorcraft, an airplane, or a drone. In various other examples, the vehicle is a land craft, such as a car, or a watercraft, such as a ship or a boat. The antenna system 100 of FIG. 1 can be implemented on the vehicle.

The example antenna system 100 is an example of an antenna system with which example embodiments of the present disclosure may be utilized. Certain variations of the antenna system 100 may be contemplated. The antenna system 100 may include a radome top 102 that protects a transmission surface 20 and one or more antennas 103, which may be referred to interchangeably as antennas. The radome top may be coupled, directly or indirectly, to the transmission surface 20 and/or a radome base 104.

The transmission surface 20 is an equi-phased transmission surface and/or phase compensated structure configured to convert spherical waves of the one or more antennas into plane waves. The transmission surface 20 has a curvature and shape substantially similar to the shape and/or curvature of the radome top 102 or matching the shape of the radome top 102, such that the transmission surface 20 can be integrated within a same structure of the radome top 102, affixed to, mounted to, or attached to the radome top 102, such as to the interior of the radome top 102 or the like, such as with any suitable materials. According to certain embodiments, the transmission surface 20 is manufactured separately from the radome top 102, and is affixable, mountable, or attachable to the radome top 102, such as with any suitable materials. According to certain embodiments, the transmission surface is affixed to at least one of an inner surface of the protective layer or a framework of the radome top 102, (e.g., the phase compensated radome top).

According to certain embodiments, the transmission surface 20 has a substantially similar curvature to a curvature of a protective layer and/or a framework of the radome top. The protective layer of the radome top 102 is configured to protect the transmission surface 20, and, when coupled to a radome base, one or more antennas disposed beneath a concave interior of the protective layer and a concave interior of the transmission surface 20.

Configuring the transmission surface 20 to have a substantially same shape and/or curvature as the radome top 102 and/or protective layer of the radome top 102 promotes space-saving efficiency and the aerodynamic characteristics of the radome top 102. The term "substantially" with regard to the transmission surface having a substantially same curvature or shape as the radome top 102 and/or a protective layer of the radome top 102, is used to account for any small variations in shape variation or curvature variation between the radome top 102 and the transmission surface 20, such as materials used to affix or integrate the two components, other seams or components, or the like, that have little impact to the overall shape and/or aerodynamic characteristics of the radome top 102 and transmission surface 20. According to certain embodiments, the radome top 102 comprises the transmission surface 20, and may be referred to as a phase compensated radome top. According to certain embodiments, the transmission surface 20 may be configured to be integrated with existing radome tops, such that external changes to radome tops or the design thereof are not needed.

Each of the antennas 103 may be positioned at least partially within or beneath the radome top 102 and/or transmission surface 20, and at least partially within the radome base 104. The radome top 102 and/or transmission surface 20 may have a concave interior, such that each of the antennas 103 may be at least partially positioned within the concave interior. In some embodiments, such as embodiments in which a radome is mounted to the front of a vehicle's fuselage or nose, the radome top 102 and/or transmission surface 20 is shaped substantially like a hemisphere, and the radome base 104 and antenna system base 110 substantially cylindrical. In certain embodiments, such as embodiments in which a radome is mounted to the empennage or tail assembly of a vehicle, the radome top 102 and/or transmission surface 20 is substantially bullet shaped, and the radome base 104 and antenna system base 110 substantially elliptical and cylindrical. However, it will be appreciated that the radome top 102 may be in any shape or configuration determined to provide protection to the one or more antennas 103, while also providing a substantially aerodynamic shape of the vehicle portion or component to which it is affixed.

The radome top 102 may comprise material that is substantially transparent to radio frequency (RF) signals such as plastic, polyethylene, and/or the like. For example, the radome top 102 can be formed or otherwise manufactured from material that is substantially transparent to RF signals. The radome top 102 may be configured to cover at least a portion of the antennas 103 and/or protect at least a portion of the antennas 103 from the environment (e.g., rain, snow, and/or the like).

The transmission surface 20 may include any structural surface, such as a, a multilayer metasurface, configured to radiate or receive electromagnetic waves. In this regard the transmission surface 20 may be referred to as a lens. The transmission surface 20 may include an arrangement of cells 22, such as dual-polarized unit cells, including but not limited to dual-band dual-polarized cells or quad-band dual-polarized cells, configured in a concave or hemisphere-shaped grid. A transmission surface 20, or a layer thereof may comprise, for example, thousands of cells 22 arranged in a pattern. According to certain embodiments, the transmission surface 20 includes one or more layers of cells 22, with a configuration having more layers supporting a relatively higher directivity than a configuration with fewer layers. According to certain embodiments, the multiple layers may have varying configurations of cells 22. The unit cells may be configured similarly as is illustrated in FIG. 1(a) of H. Hasani, J. S. Silva, S. Capdevila, M. Garcia-Vigueras and J. R. Mosig, "*Dual-Band Circularly Polarized Transmitarray Antenna for Satellite Communications at* (20, 30) *GHz*," in *IEEE Transactions on Antennas and Propagation*, vol. 67, no. 8, pp. 5325-5333 August 2019, doi: 10.1109 TAP.2019.2912495, a copy of which is hereby incorporated by reference in its entirety. The transmission surface 20 may be configured similarly as illustrated in FIG. 1(b) of Hasani et. al.

FIG. 2 is a schematic of a cell 22 of a transmission surface 20, according to example embodiments. The cell 22 of FIG. 2 is a quad-band dual-polarized cell configured to support K band, Ka band, and Ku band communication. Phase shifting or phase variation may occur based on any of the unit cell parameters such as L1, L2, L3, L4, and L5. The parameters may include different cells across the aperture and may vary across different designs and embodiments. According to certain embodiments, L2=L1/2. L1, L2, and L5 enable activation of Ku band transmission and receive elements. L3 and L4 enable activation of Ka band transmit and receive elements. In certain embodiments, the configuration of the quad-band dual-polarized unit cells enables 360-degree phase variation. A cell 22 has an aperture that captures or radiates the electromagnetic waves, and may be further configured to control phase, amplitude, and polarization of an electromagnetic wave, and may affect beam steering, beam focusing, beamwidth, and signal shaping. Numerous variations of cell 22 making up the transmission surface 20 may be contemplated.

The transmission surface 20, which may include multiple layers of cells, such as dual-band dual-polarized cells and/or quad-band dual-polarized cells, may therefore provide a relatively high gain in comparison to traditional antenna systems, by effectively converting input power into radio waves in a particular direction to efficiently and effectively establish or maintain satellite communications.

Continuing with the description of FIG. 1, the radome base 104 may comprise material that is substantially transparent to RF signals such as plastic, polyethylene, and/or the like. The radome base may be configured to cover at least a portion of the antennas 103 and/or protect at least a portion of the antennas 103 from the environment (e.g., rain, snow, and/or the like). The radome base 104 may be configured to mechanically support the antennas 103.

The radome base 104 may be coupled, directly or indirectly, to the antenna system base 110, the transmission surface 20, and/or the radome top 102. In some embodiments, the antenna system 100 includes a plurality of standoffs 112 configured to facilitate coupling of the antenna system 100 to a structure (e.g., a building), a vehicle (e.g., an aircraft, a seacraft, or a land vehicle), or equipment. Each standoff 112 may be coupled, directly or indirectly, to the antenna system base 110.

It will be appreciated that FIG. 1 is provided as an example, and alternative shapes and configurations may be contemplated. As used herein, the term radome may refer to any of the radome top 102, transmission surface 20, radome base 104 and/or combination thereof.

The antennas 103 may include one or more antennas, such as a horn antenna, a phased array, a patch array, a linear array, an array of horn antennas, a Helix, an open ended waveguide, or the like. In systems in which one or more horn antennas are used, the larger end or open end of the horn antenna(s), including the aperture, are positioned toward the concave interior of the transmission surface 20. According to certain embodiments, one or more feedhorn antennas comprise substantially conical surfaces open toward a concave interior of the transmission surface.

According to certain embodiments a single antenna, such as a single horn antenna, may be be advantageously utilized to reduce or minimize weight. The antenna system 100 may include one or more mechanical components to control movement, or adjust, of one or more antennas 103, and therefore control the corresponding beam position. In this regard the antennas 103 may be tilted, rotated, and/or laterally translated to steer the beam. The antennas 103 may therefore by laterally movable. However, in certain embodiments, such as those including antenna arrays or other configurations of multiple antennas, certain antennas may be electrically switched or activated in certain instances and based on their respective positions, in order to steer the beam. In this regard, the antenna system 100 includes one or more electrically operated switches with which to control actuation of one or more antennas 103.

The antennas 103 are configured to receive and/or transmit electromagnetic waves, such as by electrical connection to a receiver and transmitter (not shown in FIG. 1). The connection may include feedlines configured to feed power to the antennas 103. The electromagnetic waves create a communication link between the antenna system 100 and the satellite provided there is sufficient power. The electromagnetic waves are directed to form a beam that optimizes the energy in a specific direction to maintain the link, thus directing the energy to an antenna system of the satellite. The beam is dynamically positioned or steered to maintain the connection (e.g., link).

A satellite communication system (SATCOM) of a vehicle, such as an aircraft, may include the antenna system 100 of FIG. 1. The SATCOM can be configured to communicate with one or more satellites, such as geostationary satellites, using the antenna system 100. In this regard, the SATCOM may in communication with one or more satellites via radio frequency (RF) signals. The SATCOM may also be configured to communicate with one or more ground stations.

The SATCOM can, in various examples, be configured to provide Internet and/or telephone connectivity to passengers, drivers, or pilots within the vehicle. For example, the SATCOM may provide connectivity to an IP-based packet-switched communications network.

The SATCOM includes an antenna, such as antennas 103, in electrical communication with a modem. The modem is configured to demodulate RF signals received by the antennas 103 to a digital signal, and to modulate digital signals generated by the system to RF signals emitted by the antennas 103. The modem can be configured with various modulation codes to transform the digital data into analog data and vice versa.

FIG. 3 is a schematic of a partial view of an antenna system and beam pattern 200, in accordance with at least one example embodiment of the present disclosure. One or more antennas 103 beneath the transmission surface 20 may be configured to be moved laterally in the x direction such as a distance of dx. The dashed lines of the antennas 103 shows movement in the x plane. A distance and direction of the movement may be determined as disclosed herein. Additionally, or alternatively, multiple antennas 103 may be configured such that a certain antennas 103 is selected for activation based on its lateral position or dx from a reference point, and activated by an electrical switch. A configuration such as depicted in FIG. 3 allows for translation shift and elevation scanning.

FIGS. 4A-4E are schematics of partial views of an antenna system, illustrating various movements of antennas, in accordance with at least one example embodiment of the present disclosure.

Figure 4A:
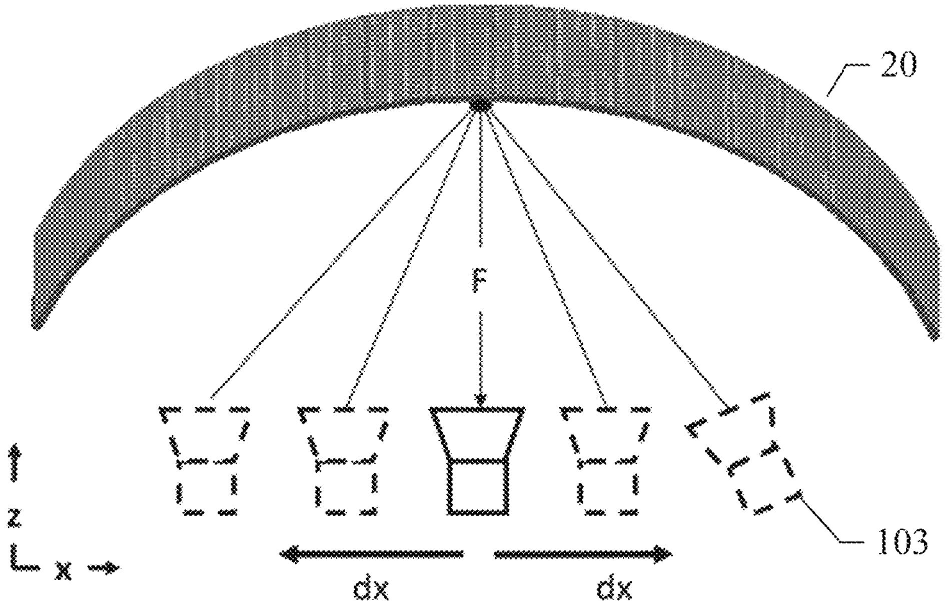
Figure 4B:
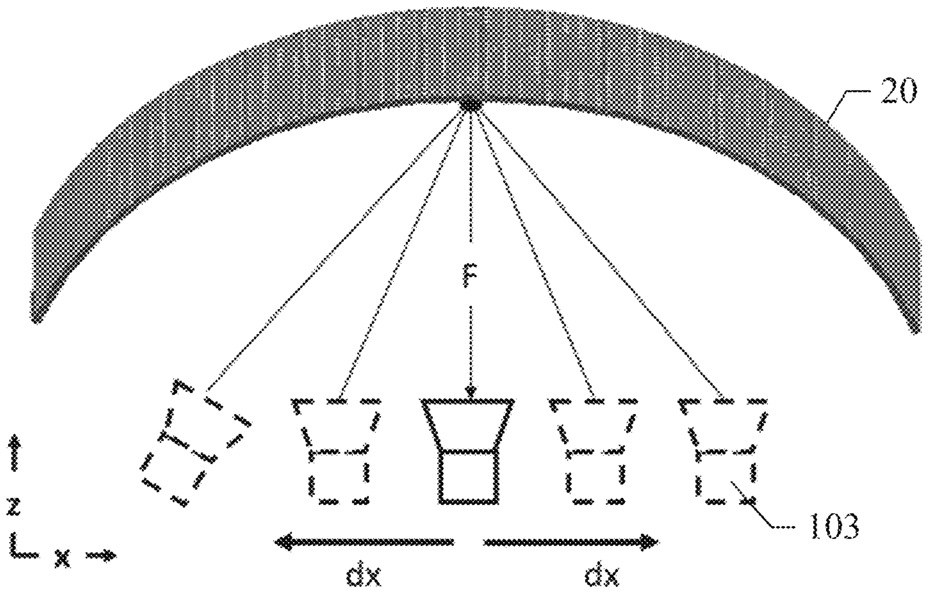

As illustrated in FIGS. 4A and 4B, in addition to or instead of lateral movement to provide translation shift, example embodiments may offset one or more antennas 103 to further enable elevation scanning. The offset provides further elevation scanning.

Figure 4C:
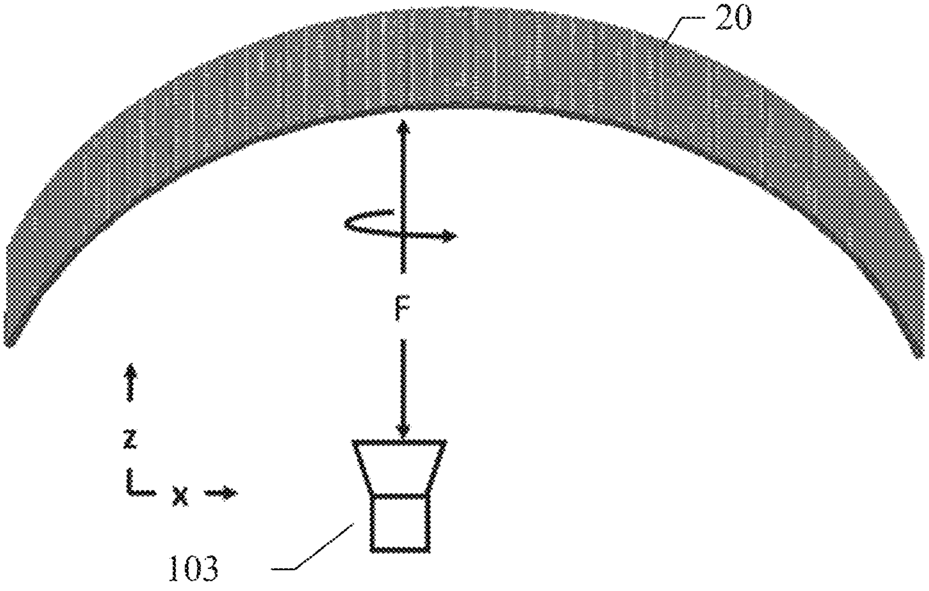

As illustrated in FIG. 4C, example embodiments may offset and/or rotate one or more antennas 103 to perform azimuth scanning.

Figure 4D:
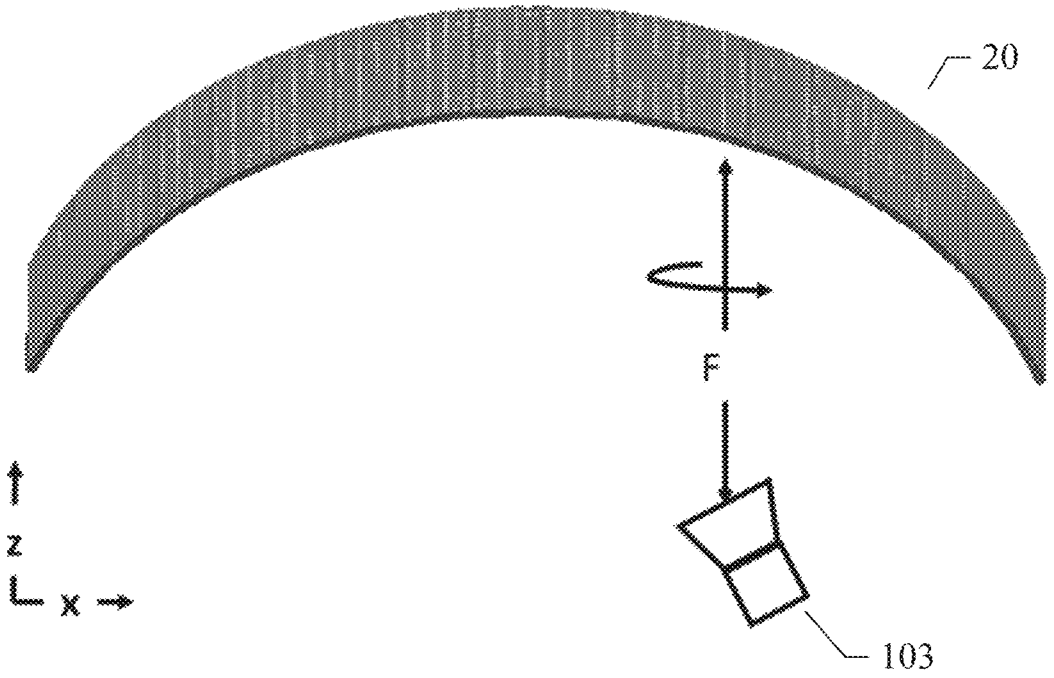
Figure 4E:
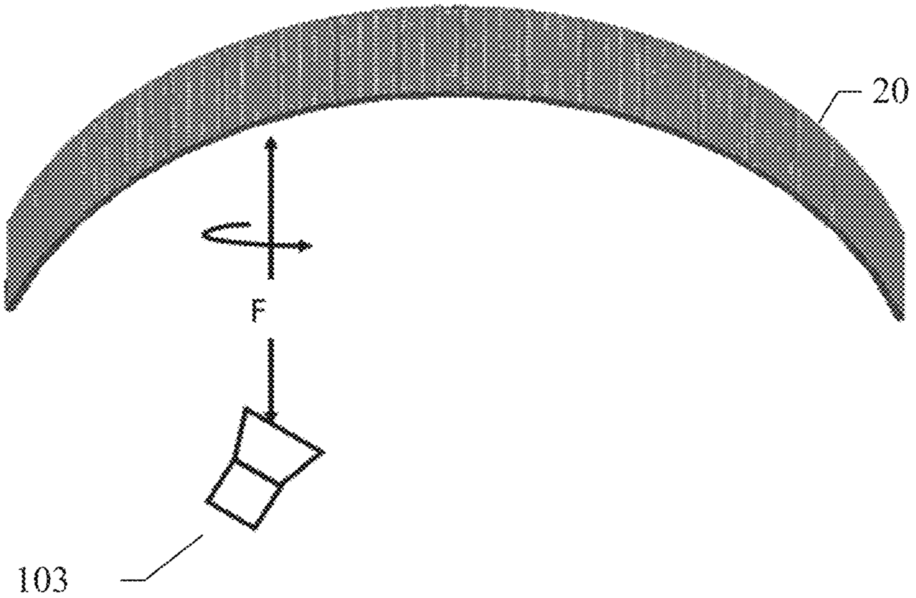

As illustrated in FIGS. 4D and 4E, example embodiments may offset, rotate, and/or tilt one or more antennas 103 to perform azimuth scanning.

Any combination of movements as described with respect to any of FIG. 3 or FIGS. 4A-4E may be performed for beam steering. An offset from center steers the beam in Elevation, and rotation round a central axis or the antennas 103 steers the beam in Azimuth. Additional tilt at the offset position optimizes the phase shifts for sidelobe improvement. According to certain embodiments, any of the movement may be mechanically induced by one or more mechanical components as described in further detail herein. Additionally or alternatively, multiple antennas 103 in an arrangement may be selectively and electrically activated to achieve an effect of a translation shift.

FIG. 5 illustrates a block diagram of an apparatus 500 embodying one more devices or systems disclosed herein, such as a system for controlling one or more aspects of the SATCOM and/or the antenna system 100. Apparatus 500 may additionally or alternatively embody other systems or subsystems of the vehicle. Numerous instances of apparatus 500 may be implemented within a vehicle to control satellite communicates as discussed herein, control the antenna system 100, control other systems of the vehicle, and/or the like. According to certain embodiments, apparatus 500 may implemented in a ground-control system that communicates with the vehicle, such as via another instance of apparatus 500 onboard the vehicle.

The apparatus 500 may be in data communication with one or more subsystems of the vehicle. The apparatus 500 may be configured to receive or determine vehicle position data indicative of the current position, which may be used by the apparatus 500 to control a position, movement, or electrical activation of one or more antennas 103. Various algorithms for positioning the antennas 103 may be utilized or implemented according to example embodiments and may vary depending on the vehicle type or model, antenna type, antenna configuration, and/or the like.

The apparatus 500 may control one or more mechanical components to control positioning of one or more antennas 103, including controlling movement in any direction along an x-axis or y-axis, rotating, tilting, and/or the like, of any portion of the antennas 103. According to certain embodiments, the apparatus 500 may control one or more electrical switches and/or electrical components to activate one or more antennas 103. According to certain embodiments, the apparatus 500 controls such mechanical or electrical components to enable the SATCOM to maintain or attempt to maintain connectivity with the satellite.

According to certain embodiments, apparatus 500 may be a microcontroller or integrated circuit, such as to control power switching at one or more antennas 103.

The apparatus 500 includes processor 502, memory 504, input/output circuitry 506, and/or communications circuitry 508. In some embodiments, the apparatus 500 is configured, using one or more of the sets of circuitry embodied by processor 502, memory 504, input/output circuitry 506, communications circuitry 508, to execute and perform the operations described herein.

In general, the terms computing entity, device, system, and/or similar words used herein interchangeably may refer to, for example, one or more computers, computing entities, desktop computers, distributed systems, terminals, servers or server networks, gateways, switches, processing devices, processing entities, relays, routers, network access points, the like, and/or any combination of devices or entities adapted to perform the functions, operations, and/or processes described herein. In one embodiment, these functions, operations, and/or processes can be performed on data, content, information, and/or similar terms used herein interchangeably. In this regard, the apparatus 500 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium (s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 500 provide or supplement the functionality of another particular set of circuitry. For example, the processor 502 in some embodiments provides processing functionality to any of the sets of circuitry, the memory 504 provides storage functionality to any of the sets of circuitry, the communications circuitry 508 provides network interface functionality to any of the sets of circuitry, and/or the like.

In some embodiments, the processor 502 (and/or co-processor or any other processing circuitry assisting or otherwise associated with the processor) is/are in communication with the memory 504 via a bus for passing information among components of the apparatus 500. In some embodiments, for example, the memory 504 is non-transitory and may include, for example, one or more volatile and/or non-volatile memories. In other words, for example, the memory 504 in some embodiments includes or embodies an electronic storage device (e.g., a computer readable storage medium). In some embodiments, the memory 504 is configured to store information, data, content, applications, instructions, or the like, for enabling the apparatus 500 to carry out various functions in accordance with example embodiments of the present disclosure.

According to certain embodiments, memory 504 may store computer program code providing algorithms for controlling one or more mechanical parts to position one or more antennas 103, and/or for actuating switches or electrical components of the antenna system 100. For example, the algorithms may utilize one or more of Global Positioning System (GPS) based positioning, Inertial Measurement Unit (IMU) based positioning, radio frequency (RF) tracking, or the like.

The input/output circuitry 506 is optional in certain instances of apparatus 500. For example, when apparatus 500 is implemented as a microcontroller, input/output circuitry 506 may be excluded. However, certain instances of apparatus 500 may include input/output circuitry 506 to receive input or provide output to a user.

The processor 502 may be embodied in a number of different ways. For example, in some example embodiments, the processor 502 includes one or more processing devices configured to perform independently. Additionally or alternatively, in some embodiments, the processor 502 includes one or more processor(s) configured in tandem via a bus to enable independent execution of instructions, pipelining, and/or multithreading. The use of the terms "processor" and "processing circuitry" should be understood to include a single core processor, a multi-core processor, and/or multiple processors internal to the apparatus 500.

In an example embodiment, the processor 502 is configured to execute instructions stored in the memory 504 or otherwise accessible to the processor. Alternatively or additionally, the processor 502 in some embodiments is configured to execute hard-coded functionality. As such, whether configured by hardware or software methods, or by a combination thereof, the processor 502 represents an entity (e.g., physically embodied in circuitry) capable of performing operations according to an embodiment of the present disclosure while configured accordingly. Alternatively or additionally, as another example in some example embodiments, when the processor 502 is embodied as an executor of software instructions, the instructions specifically configure the processor 502 to perform the algorithms embodied in the specific operations described herein when such instructions are executed.

According to certain embodiments, the processor 502 may include one or more field-programmable gate arrays (FPGAs), logic circuits, or the like, for actuating one or more switches to open or close, and therefore enable or prevent transmission of the RF signal to the one or more antennas 103.

As one particular example embodiment, the processor 502 is configured to perform various operations associated with controlling operation of the SATCOM. In some such embodiments, the processor 502 includes hardware, software, firmware, and/or a combination thereof to perform such operations.

In some embodiments, the apparatus 500 includes communications circuitry 508. The communications circuitry 508 includes any means such as a device or circuitry embodied in either hardware or a combination of hardware and software that is configured to receive and/or transmit data from/to a network and/or any other device, circuitry, or module in communication with the apparatus 500. In this regard, in some embodiments the communications circuitry 508 includes, for example, a network interface for enabling communications with a wired or wireless communications network. Additionally or alternatively in some embodiments, the communications circuitry 508 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 508 includes circuitry for interacting with the antenna(s) and/or other hardware or software to cause transmission of signals via the antenna(s) or to handle receipt of signals received via the antenna(s). In some embodiments, the communications circuitry 508 enables transmission to and/or receipt of data amongst various components described herein.

Apparatus 500 may be in data communication, via communications circuitry 508 with one or more subsystems of the vehicle. The communications circuitry 508 may be configured to receive or determine vehicle position data indicative of the current position, which may be used by the apparatus 500 to control a position, movement, or electrical activation of one or more antennas 103. According to certain embodiments, communications circuitry 508 may enable data communication to control movement of a mechanical part to control movement of, or adjust, one or more antennas 103, or to control actuation of one or more switches of the antenna system 100.

In some embodiments, two or more of the sets of circuitries embodying processor 502, memory 504, input/output circuitry 506, communications circuitry 508, are combined. Alternatively or additionally, in some embodiments, one or more of the processor 502, memory 504, input/output circuitry 506, communications circuitry 508, perform some or all of the functionality described associated with another component. For example, in some embodiments, two or more of the processor 502, memory 504, input/output circuitry 506, communications circuitry 508, are combined into a single module embodied in hardware, software, firmware, and/or a combination thereof.

FIG. 6 is a flowchart of example operations that may be performed by the apparatus 500 according to certain example embodiments. At operation 600, the apparatus 500 includes means, such as the processor 502, memory 504, communications circuitry 508 and/or the like, for controlling movement of one or more antennas via one or more mechanical components. In this regard, the memory 504 may include computer program code and algorithms for controlling either directly or indirectly such as via another apparatus or system, mechanical components configured to laterally translate, rotate and/or tilt one or more antennas 103.

At operation 602, the apparatus 500 includes means, such as the processor 502, memory 504, communications circuitry 508 and/or the like, for, controlling actuation of one or more antennas 103 with one or more electrical components, such as one or more electrically operated switches. The electrical components can be operated to allow or prevent the signal from the feed from reaching certain antennas as controlled by the apparatus 500. In this regard, the memory 504 may include computer program code and algorithms for controlling either directly or indirectly such as via another apparatus or system, the electrical components.

The improved antenna system 100 disclosed herein may enable a meaningful weight and size reduction of the antenna(s), in comparison to antennas of traditional antennas systems used in satellite communications. The improved antenna system 100 may therefore provide improvements to fuel efficiency and maneuverability of a vehicle. Configuring the transmission surface to be substantially the same shape as or to have substantially the same curvature as the radome top enables aerodynamic characteristics of existing aircrafts and/or radomes or designs thereof to be maintained.

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. An antenna system, comprising:

one or more antennas disposed beneath a concave interior of a transmission surface; and the transmission surface, wherein the transmission surface comprises multiple layers of phase-shifting cells configured to convert spherical waves emitted by the one or more antennas into plane waves.

2. The antenna system according to claim 1, wherein the one or more antennas comprise one or more feedhorn antennas, and wherein the one or more feedhorn antennas comprise substantially conical surfaces open toward the concave interior of the transmission surface.

3. The antenna system according to claim 1, further comprising:

one or more mechanical components configured to adjust the one or more antennas.

4. The antenna system according to claim 1, further comprising:

one or more electrically operated switches configured to control actuation of the one or more antennas.

5. The antenna system according to claim 1, wherein the transmission surface is configured to output a wavefront having a substantially uniform phase across an aperture of the transmission surface.

6. The antenna system according to claim 1, wherein the transmission surface is mountable to an inner surface of a radome top.

7. The antenna system according to claim 1, wherein the transmission surface is a phase compensated structure.

8. The antenna system according to claim 1, wherein the multiple layers comprise one or more dual-band dual-polarized cells or quad-band dual-polarized cells.

9. The antenna system according to claim 1, wherein the one or more antennas are tiltable.

10. The antenna system according to claim 1, wherein the one or more antennas are rotatable.

11. The antenna system according to claim 1, the one or more antennas are laterally movable.

12. The antenna system according to claim 1, configured to support communication across one or more of a Ku frequency band, a K frequency band, or a Ka frequency bands.

13. The antenna system according to claim 1, wherein one or more antennas comprise one or more feed antennas.

14. The antenna system according to claim 1, wherein the transmission surface comprises an array of one or more dual-band dual-polarized cells or quad-band dual-polarized cells.

15. A phase compensated radome top comprising:

a transmission surface having a substantially similar curvature to a curvature of at least a protective layer of the phase compensated radome top; and the protective layer, wherein the protective layer is configured to protect the transmission surface, and, when coupled to a radome base, one or more antennas disposed beneath a concave interior of the protective layer and a concave interior of the transmission surface.

16. The phase compensated radome top according to claim 15, wherein the transmission surface is to output a wavefront having a substantially uniform phase across an aperture of the transmission surface.

17. The phase compensated radome top according to claim 15, wherein the transmission surface is affixed to at least one of an inner surface of the protective layer or a framework of the phase compensated radome top.

18. The phase compensated radome top according to claim 15, wherein the transmission surface is configured to convert spherical waves of emitted by the one or more antennas into plane waves.

19. The phase compensated radome top according to claim 15, wherein the transmission surface comprises multiple layers of one or more dual-band dual-polarized cells or quad-band dual-polarized cells.

20. A transmission surface comprising an array of one or more of dual-band dual-polarized cells or quad-band dual-polarized cells, wherein the one or more of the dual-band dual-polarized cells or the quad-band dual-polarized cells are configured to convert spherical waves emitted by one or more antennas into plane waves.

* * * * *